US007604541B2

(12) United States Patent
Aikin et al.

(10) Patent No.: US 7,604,541 B2
(45) Date of Patent: Oct. 20, 2009

(54) SYSTEM AND METHOD FOR DETECTING COLLUSION IN ONLINE GAMING VIA CONDITIONAL BEHAVIOR

(75) Inventors: Jeffrey C. Aikin, Arlington, VA (US); Brandon Goldfedder, Herndon, VA (US); James C. Ostheimer, Washington, DC (US)

(73) Assignee: Information Extraction Transport, Inc., Arlington, VA (US)

( * ) Notice: Subject to any disclaimer, the term of this patent is extended or adjusted under 35 U.S.C. 154(b) by 212 days.

(21) Appl. No.: 11/396,339

(22) Filed: Mar. 31, 2006

(65) Prior Publication Data

US 2007/0232398 A1    Oct. 4, 2007

(51) Int. Cl.
*A63F 13/12* (2006.01)
(52) U.S. Cl. .............................. 463/42; 463/11; 463/12; 463/13; 273/292; 273/293; 705/38
(58) Field of Classification Search ............. 463/10–13, 463/16–22, 25, 29, 40–42; 273/138.1, 139, 273/142 A, 142 B, 142 J, 148 A, 148 B, 149 P, 273/149 R, 148 R, 274, 292–293, 304, 306, 273/309; 235/375, 379–380; 705/35, 38; 704/273; 707/100, 102; *A63F 13/12*
See application file for complete search history.

(56) References Cited

U.S. PATENT DOCUMENTS

| 5,627,886 | A  | * | 5/1997  | Bowman ..................... 379/111 |
| 5,768,354 | A  | * | 6/1998  | Lange et al. ................. 379/189 |
| 5,819,226 | A  | * | 10/1998 | Gopinathan et al. ........... 705/44 |
| 6,208,720 | B1 | * | 3/2001  | Curtis et al. ........... 379/114.14 |
| 6,516,056 | B1 | * | 2/2003  | Justice et al. ................ 379/145 |
| 6,629,890 | B2 |   | 10/2003 | Johnson et al. |
| 6,949,022 | B1 |   | 9/2005  | Showers et al. |
| 6,966,832 | B2 |   | 11/2005 | Leen et al. |
| 2001/0031663 | A1 |   | 10/2001 | Johnson et al. |
| 2002/0103029 | A1 |   | 8/2002  | Finlayson et al. |
| 2003/0097330 | A1 | * | 5/2003  | Hillmer et al. ................. 705/38 |
| 2004/0242321 | A1 |   | 12/2004 | Overton |
| 2005/0033712 | A1 |   | 2/2005  | D'Ambrosio |
| 2005/0159212 | A1 |   | 7/2005  | Romney et al. |
| 2005/0198299 | A1 |   | 9/2005  | Beck et al. |
| 2005/0282624 | A1 |   | 12/2005 | Kane |
| 2006/0068871 | A1 |   | 3/2006  | Crawford, III et al. |
| 2006/0069697 | A1 | * | 3/2006  | Shraim et al. ................ 707/102 |

(Continued)

FOREIGN PATENT DOCUMENTS

WO    WO 2004071601 A2  *  8/2004

*Primary Examiner*—Peter DungBa Vo
*Assistant Examiner*—Arthur O. Hall
(74) *Attorney, Agent, or Firm*—Sheppard Mullin Richter & Hampton; David E. Heisey

(57) ABSTRACT

The present invention provides a system and method for detecting collusion in online gaming involving a plurality of players, the method comprising storing game information data and game action data on every action in every game for every player in the online gaming database, performing a player action analysis of correlated actions between a pair of online game players and storing data from the player action analysis in a user action database, employing one or more Bayesian Network graphical models to determine a likelihood of conditional behavior between the pair of online game players, computing individual scores for the Bayesian Network graphical models and comparing the score of a collusional model with that of a non-collusional model.

10 Claims, 13 Drawing Sheets

U.S. PATENT DOCUMENTS

| | | |
|---|---|---|
| 2006/0121968 A1 | 6/2006 | Daniel |
| 2006/0189381 A1* | 8/2006 | Daniel et al. .................. 463/29 |
| 2006/0202012 A1* | 9/2006 | Grano et al. ................ 235/379 |
| 2006/0247038 A1* | 11/2006 | Bamberger et al. ........... 463/29 |
| 2007/0038460 A1* | 2/2007 | Navratil et al. .............. 704/273 |
| 2007/0090181 A1* | 4/2007 | Varadarajan et al. ........ 235/380 |
| 2007/0238502 A1* | 10/2007 | Pokorny et al. ............... 463/12 |

* cited by examiner ated by cheating among the participants. In free market
economies, monopolies and cartels have been outlawed
because collusion allows pricing to be coordinated among
suppliers to the detriment of consumers. Examples of collusion that adversely affects the fairness of games and leisure
SYSTEM AND METHOD FOR DETECTING COLLUSION IN ONLINE GAMING VIA CONDITIONAL BEHAVIOR

FIELD OF THE INVENTION

The invention broadly relates to online gaming and more particularly to a system and method for detecting collusion in online gaming via conditional behavior.

BACKGROUND OF THE INVENTION

Many industries and leisure activities can be adversely affected by cheating among the participants. In free market economies, monopolies and cartels have been outlawed because collusion allows pricing to be coordinated among suppliers to the detriment of consumers. Examples of collusion that adversely affects the fairness of games and leisure activities include point shaving in sporting events and collusionary practices among online poker players.

Poker is a game ripe with opportunities to collude because it includes an element of chance. In particular the currently popular Texas Hold-em variant of poker lends itself to scenarios in which collusion between players is a rewarding strategy. Colluders can identify who amongst them has the best hand and play off each other to artificially inflate a pot against a non-colluding player. Additionally, the colluders have knowledge about what possible hands they can form, and what hands others can and cannot form. Moreover, colluders can minimize their losses by knowing better when to get out of a game that cannot be won.

The online variant of poker provides a significantly different challenge to collusion detection than traditional table poker because of the lack of physical contact between players and the presence of communications tools such as phones, instant messaging etc. Most poker collusion relies on the passing of what should be privileged information between players, such as indicating the strength of one's hand to a fellow player at the table.

Maintaining secure, fair games in online gaming is a difficult and complicated issue for online gaming firms. Although there are many ways to unfairly play the games, one of the biggest problems is collaboration among players in non-collaborative games (such as poker). Generally, firms that host online play environments rely on two primary forms of collusionary play detection, including: (1) user reporting; and (2) rules-based systems for detecting anomalies.

User reporting detection relies on users (players in the games) to report suspicious activity to the online gaming firm which they subsequently investigate. The outcomes of these investigations can involve the suspension or dismissal of a player who has been found guilty of cheating. Utilizing rules-based systems for detecting play anomalies involves having an expert game player (whatever the game may be) develop rules that most players will adhere to when playing (logical play). When these rules are consistently bent or broken by a player an investigation is triggered into the player's actions. As in the user reporting case, investigations can lead to suspension or dismissal for the offending player.

Both of the above-identified forms of unfair play detection have major weaknesses. With respect to user reporting, the reliance on less experienced users to report suspicious behavior may result in a large number of false detections of collusionary play. Online gaming users may not play with colluding players long enough to note the collaboration going on, and therefore collusionary play may never be submitted for investigation. Since some of these online games involve play where not all of the game's information is represented to user (but is stored by the online gaming firm), the online gaming user may not even have the requisite information to spot the collusionary play. Regarding rules-based systems, the reliance on a fixed set of rules can falsely detect a novice's bad play of the game as collusionary play. The fixed set of rules can be probed and techniques for circumventing detection by the rules can be developed by the collaborating players.

In view of the above, there exists a need for a system and method for detecting collusion in online gaming without the need to rely on any previously-established sets of rules or the need to rely on users with incomplete information for unfair play detection.

Additionally, there exists a need for a system and method for detecting collusion in online gaming via conditional behavior in order to maintain secure, fair games in the online gaming industry.

There further exists a need for a system and method for detecting collusion in online gaming including protecting online gaming users from unfair play in the form of collusion by detecting collusionary tactics through conditional behavior signatures.

SUMMARY OF THE INVENTION

In view of the foregoing, it is an object of the present invention to provide a system and method for detecting collusion in online gaming without the need to rely on any previously-established sets of rules or the need to rely on users with incomplete information for unfair play detection.

It is another object of the present invention to provide a system and method for detecting collusion in online gaming via conditional behavior in order to maintain secure, fair games in the online gaming industry.

It is a further object of the present invention to provide a system and method for detecting collusion in online gaming including protecting online gaming users from unfair play in the form of collusion by detecting collusionary tactics through conditional behavior signatures.

One aspect of the present invention involves a method for detecting collusion in online gaming involving a plurality of players, comprising collecting data on every action in every game for every player and sending the data to an online gaming database, storing game information data on every action in every game for every player in the online gaming database, storing game action data on every action in every game for every player in the online gaming database, performing a player action analysis of correlated actions between a pair of online game players and building a user action database with data obtained in the player action analysis, creating one or more Bayesian Network graphical models, employing the Bayesian Network graphical models to determine a likelihood of conditional behavior between the pair of online game players, computing individual scores for the Bayesian Network graphical models using a Bayesian statistical technique, comparing the score of a collusional model with that of a non-collusional model, and performing a collusion threshold analysis using a thresholding scheme to determine whether the collusional model is appropriate for the pair of online game players.

The above method may further comprise the steps of: (1) sending an analysis results alert to notify an appropriate online gaming firm of the possibility of unfair collusional play; (2) determining a likelihood of fairness of a particular online game; and/or (3) probabilistically evaluating the play of a particular online game player. Additionally, the step of collecting data may entail the collection of historical information that is used to construct and analyze models of behavior for the detection of collusion. Further, the step of collecting data may involve the collection of streamed information that is used to construct and analyze models of behavior for the detection of collusion. By way of example, the online game may comprise poker.

Another aspect of the invention involves a method for detecting collusion in online gaming involving a plurality of players, comprising storing game information data and game action data on every action in every game for every player in the online gaming database, performing a player action analysis of correlated actions between a pair of online game players and storing data from the player action analysis in a user action database, employing one or more Bayesian Network graphical models to determine a likelihood of conditional behavior between the pair of online game players, computing individual scores for the Bayesian Network graphical models, and comparing the score of a collusional model with that of a non-collusional model. The method of claim 8, further comprising the step of collecting data on every action in every game for every player and sending the data to the online gaming database. The method may further comprise the steps of: (1) creating the one or more Bayesian Network graphical models; (2) computing individual scores for the Bayesian Network graphical models is performed using a Bayesian statistical technique; and/or (3) performing a collusion threshold analysis using a thresholding scheme to determine whether the collusional model is appropriate for the pair of online game players.

A further aspect of the invention involves a system for detecting collusion in online gaming among a plurality of online game players, comprising an online poker firm, a collusion detection suite designed to discover collaboration among pairs of players in an online poker game, an online gaming server that controls the functionality of online games and an online gaming database that receives game information and game action data from the online gaming server, wherein the online poker firm collects and stores data on every action in every game for every player in the online gaming database, wherein the collusion detection suite examines the data in the online gaming database to determine the likelihood that two or more online game players are collaborating with one another.

In the preferred system of the invention, the collusion detection suite examines data on every combination of pairs of players that are playing in the same game. Additionally, the collusion detection suite includes a user action database for storing information pertaining to correlated actions between two online game players. The collusion detection suite is employed to create one or more Bayesian Network graphical models to determine the likelihood of conditional behavior between a pair of online game players. In particular, a first Bayesian Network graphical models is designed to represent forms of collusional behavior, and a second Bayesian Network graphical models is designed to represent forms of non-collusional behavior. Moreover, the collusion detection suite compares the scores of the collusional and non-collusional models, and then uses a thresholding scheme to determine whether the collusional model is appropriate for the pair of online game players. The system may alert the online poker firm of the possibility of unfair collusional play if the collusion detection suite determines that the collusional model is appropriate for the pair of online game players. As an example, the online game may comprise poker.

DETAILED DESCRIPTION

Figure 1:
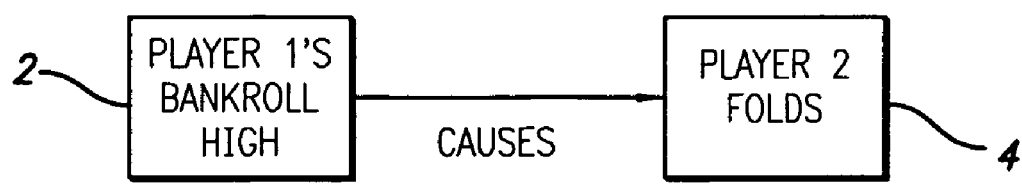
FIG. 1 is a schematic diagram illustrating conditional behavior in an online poker game wherein one player's bankroll causes another player to fold.

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

In accordance with the principles of the present invention, a system and method are provided for detecting collusion among players in online games. The system and method preferably implemented using a computer software program residing on a server of an online gaming firm. The software program comprises machine readable or interpretable instructions for gathering various data and determining whether hidden information was shared illegally between players of online games. The system and method described herein may involve detecting collusionary tactics through conditional behavior signatures, wherein the identification of conditional behavior may be performed using a Bayesian statistical algorithm in conjunction with a graphical model to represent the behavioral dependencies.

The system and method set forth herein provide a process by which an online gaming firm can gather information from game play and analyze the information to detect collusion among players. When a player takes an action in a game, data sufficient to describe the action is stored in a database of the online gaming firm. Subsequently, the whole of the player's actions are analyzed conditional to other players' actions. Similarly, game information available only to the online gaming firm is stored in the database and referenced to the game being played and the players in the game. Using the information stored in the database, the software program of the invention determines the probability of collusion between the players and reports its findings to appropriate online gaming firm authorities, if necessary. One feature of the software program of the invention involves the use of behavioral information and hidden information to examine the possibility of collaboration between players. Such hidden information is known only to the online gaming firm. This feature may involve the use of: (1) graphical models to represent conditional dependence and independence of players actions; and/or (2) Bayesian Statistical techniques to determine the likelihood of conditional behavior between players.

According to the invention, effective collusion occurs when hidden information is passed between two or more players. Hidden information refers to information that by the rules of the game should be known only to a single player. In poker there are many types of non-hidden information that are passed between players including, but not limited to, facial expressions, nervous ticks, reaction time and other "tells". This type of information allows skilled poker players to better evaluate the strength of their opponents hands. Additionally, there exist many non-psychological forms of legal information transfer including, but not limited to, a player's bankroll, common cards and play history. Since the game revolves around decision-making with partial information, the most important hidden information is knowledge of an opposing player's hand. With this knowledge, other tactics such as a shared strategy are possible, giving colluders an unfair advantage in an otherwise fair game.

With regard to the detecting of collusional behavior in online gaming, the sharing of hidden information among players is ineffectual unless the colluding players act on the knowledge they gain from the hidden information. If players are colluding without acting on the hidden information received, or if they act in a manner consistent with fair play, they will gain no benefit from their cheating and there is no resultant problem to resolve. On the other hand, actions taken due to hidden information result in different types of behavior than non-colluding players will present. Detecting the differences in behavior of the colluding players is paramount to the system and method for collusion detection described herein.

Figure 2:
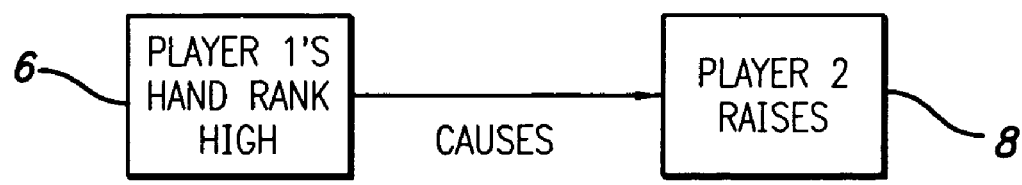
FIG. 2 is a schematic diagram illustrating conditional behavior in an online poker game wherein one player's hand rank causes another player to raise.

In online gaming, there may exist conditional behavior among any two or more players, wherein one or more actions are undertaken based on the current known situation and a player's beliefs about the future. For example, a poker player may decide to fold based on another player's bankroll, play history or other non-hidden available information. FIG. 1 illustrates this conditional behavior by showing that when Player 1's bankroll is high (step 2) Player 2 is caused to fold (step 4). Since the other player's bankroll is non-hidden information, this type of conditional behavior is legal. However, in the collusion paradigm, two or more players will have conditional behavior through a hidden form of information. Referring to FIG. 2, another example is provided wherein if a colluding partner (Player 1) has a strong hand (step 6), then the other colluding player (Player 2) raises with a weak hand (step 8). In this instance, Player 2's action of raising with a weak hand is conditional upon Player 1 having a strong hand. Since the other player's hand rank is hidden information in a legal game, this type of conditional behavior is indicative of collusional activities.

In order to detect causal behavior between players in an online poker game, the problem may be modeled as a Bayesian Network. Specifically, the conditional (and causal) nature of the problem may be described using conventional Bayesian Network formalism. Additionally, the Bayesian Network also provides a built in capability for both learning structures and scoring known structures against data. A Bayesian Score may then be employed to score different graph structures against data from poker games. In the simplest interpretation, if the structure with the highest score has an illegal causation, then the conclusion is that the players may be colluding.

Figure 3:
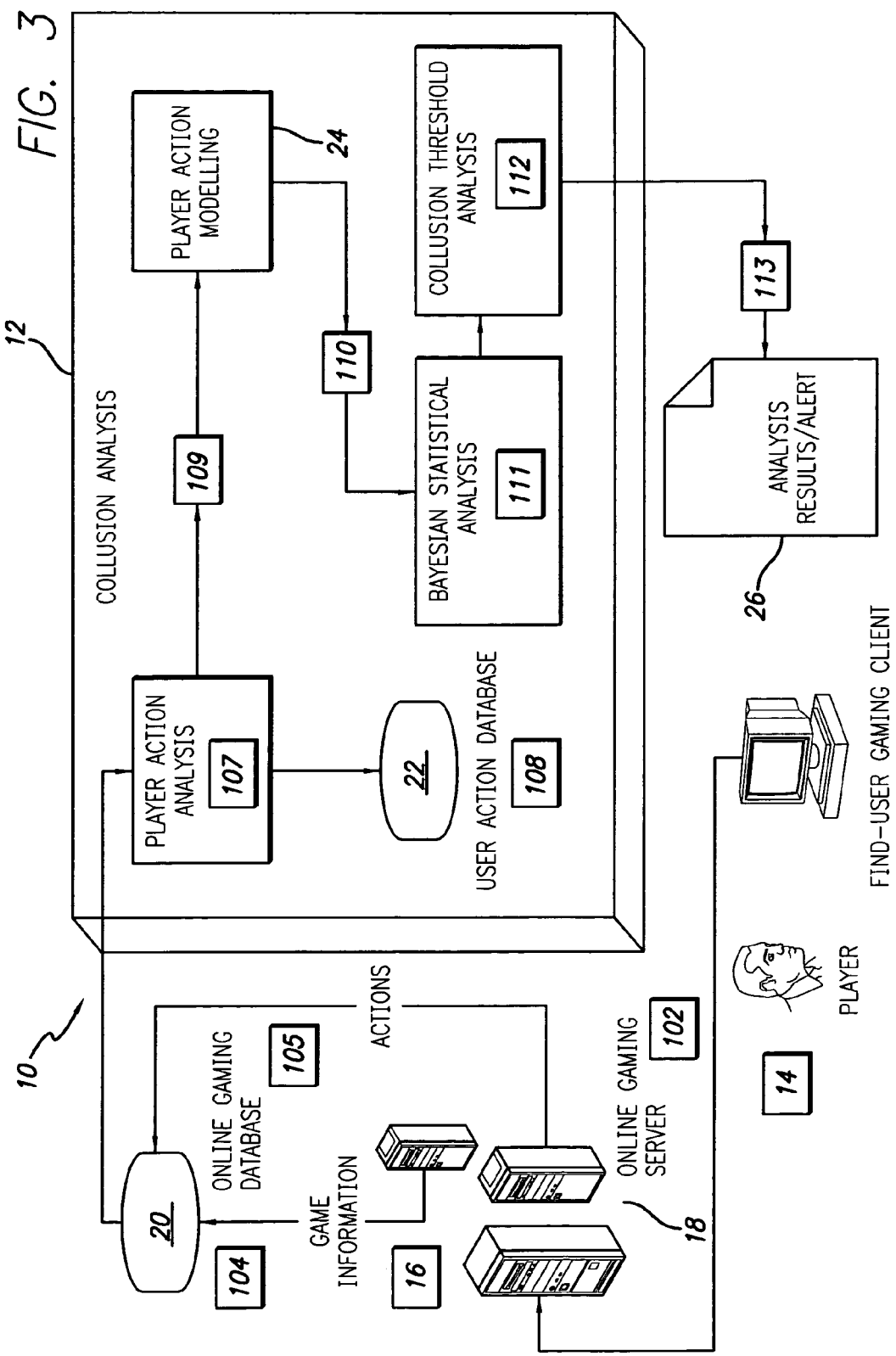
FIG. 3 is a schematic diagram illustrating a preferred system for detecting collusion in online gaming among a plurality of online game players, in accordance with the principles of the present invention.

Referring to FIG. 3, in accordance with the principles of the present invention, a preferred system 10 for detecting collusion in online gaming among a plurality of online game players 14 comprises a collusion detection suite 12 designed to discover collaboration among pairs of players in an online poker game. The preferred system 10 of present invention is presented in terms of online poker for illustrative purposes only, to particularly point out and describe the details of the invention. As would be appreciated by those of ordinary skill in the art, the system and method described herein may be employed for detecting collaboration in many other types of online games without departing from the scope of the invention. By way of example, the system and method of the invention may be used to detect collusion among players of online first person shooter games.

With continued reference to FIG. 3, the preferred system 10 comprises the collusion detection suite 12, an online poker firm 16, an online gaming server 18, and an online gaming database 20. In particular, the online poker firm 16 collects and stores data on every action in every game for every player 14 in the online gaming database 20. The data is examined to determine the possibility that two or more players are collaborating with one another. Specifically, the collusion detection suite 12 examines data on every combination of pairs of players that are playing in the same game. The collusion detection suite 12 preferably includes a user action database 22 for storing information pertaining to correlated actions between two online game players 14. The actions are correlated in the sense that the players 14 follow one another in the poker game. Additionally, the collusion detection suite 12 is employed to create one or more Bayesian Network graphical models 24 to determine the likelihood of conditional behavior between two online game players 14. The online gaming server 18 comprises a host computer on a network that holds information and responds to requests for information. The term "server" is also used to refer to the software of the invention that resides on the server 18. In general, the server 18 controls the functionality of the online games and sends game information and game action data to the online gaming database 20, which stores this information.

The user action database 22 comprises various pertinent information regarding the selected pair of online players 14 (i.e., Player 1 & Player 2). Such information may include without limitation: (1) the actions of Player 1; (2) the hand strength of Player 1; (3) the actions of Player 2; and (4) the hand strength of Player 2. In operation, Player 1's data is always correlated to Player 2's data in that Player 2 is one step behind Player 1 in game play. As a result, Player 2's action or hand strength can be viewed as causing Player 1's action.

Hand strength can be determined by any number of standard algorithms that are conventional and per se known in the art.

As set forth hereinabove, the collusion detection suite 12 is employed to score one or more Bayesian Network graphical models 24 to determine the likelihood of conditional behavior between two online game players 14. The Bayesian Network graphical models 24 may be: (1) learned from known collusional and non-collusional data; (2) developed by experts; or (3) a combination thereof. The Bayesian Network graphical models 24 are designed to represent forms of collusional and non-collusional behavior. One model 24 describes collusional behavior, which is defined as behavior where the actions of Player 1 are correlated to Player 2's hand strength. Of course, in the game of poker, a player's hand is hidden information with respect to the other players, such that Player 2's hand strength would be unknown to Player 1. The remaining Bayesian Network graphical models 24 describe non-collusional or legal behavior. Scores for the individual models 24 may be computed via a Bayesian statistical technique.

After computing the score for the individual models, the collusion detection suite 12 compares the ratios of the scores of the collusional and non-collusional models. The collusion detection suite 12 may then use a conventional thresholding scheme to determine whether the collusional model is appropriate for the pair of online game players 14 in question. For example, given the data provided, the thresholding scheme may be employed to determine whether the collusional model has a higher score than that of the non-collusional models. If such a situation occurs, the system 10 may alert the online poker firm's security personnel of the possibility of unfair collusional play. By way of example, the alert may comprise an analysis results alert 26 in the form of a letter, email, text message, facsimile, or other conventional type of message.

With further reference to FIG. 3, a preferred method for detecting collusion in online gaming will now be described. Specifically, in step 102, the online poker firm 16 collects data on every action in every game for every player 14 in the online gaming database 20 and sends the updated information to the database 20 via the online gaming server 18. Step 104 involves storing game information data on every action in every game for every player 12 in the online gaming database 20. Similarly, step 105 involves storing game action data on every action in every game for every player 12 in the online gaming database 20. In step 107, the collusion detection suite 12 performs a player action analysis of correlated actions between a pair of online game players 14 and builds the user action database 22 with data obtained in the player action analysis. Step 109 involves creating one or more Bayesian Network graphical models 24 using the collusion detection suite 12. These models 24 are employed to determine the likelihood of conditional behavior between the pair of online game players 14.

After determining the likelihood of conditional behavior, the method proceeds to step 110, wherein individual scores for the Bayesian Network graphical models 24 are computed, for example using a Bayesian statistical technique. Step 111 involves comparing the score of the collusional model with that of the non-collusional model using the collusion detection suite 12. In step 112, the collusion detection suite 12 performs a collusion threshold analysis using a thresholding scheme to determine whether the collusional model is appropriate for the players in question. In step 113, the system 10 sends an analysis results alert 26 (e.g., to the online poker firm's security personnel) to notify the online poker firm 16 of the possibility of unfair collusional play. Step 113 is performed only if it is determined that the collusional model is appropriate for the pair of players 14 in question.

The above-described method of the invention may involve the use of historical and/or streamed information that is employed to construct and analyze models of behavior for the detection of collusion on online gaming. Particularly, the method may be used to determine the likelihood of fairness of an online game, or to make a probabilistic evaluation of the play of a given player in the online game. The method may further comprise modeling collusionary and non-collusionary behavior in a graphical belief network. The method may be implemented using a system comprising a feed of actions, a Bayesian calculator, and a mechanism of reporting the results. The system may further comprise a mechanism to integrate with existing rules-based and manual approaches to augment existing capabilities.

To test the system and method for detecting collusion in online gaming described herein, a simulation capability was developed utilizing a group of automated poker players ("bots") to simulate poker games. Specifically, off-the-shelf pre-built bots were used for the non-colluding players, whereas custom bots were developed to represent colluding players. All tests were done in a simulator targeting a $20/$40 cash limit version of Texas Hold-em poker. Such cash limit games are an easy target for bots and humans wishing to collude.

In order to produce colluding bots, off-the-shelf bots were modified to include some basic collusion capabilities. Particularly, these bots were customized to know what their colluders' cards are from the very first moment they are dealt. Additionally, the bots were modified to have the capability to re-evaluate all hand probabilities of all players with the knowledge of their colluders' cards. In other words, the customized, colluding bots were tailored to have different, more accurate, probability distributions stored for the other players' hands than non-colluding, off-the-shelf bots. An algorithm was then employed to determine how the bots would collude by observing the actions taken. For the following discussion, the colluding bots are referred to as Bot 1 and Bot 2, and it is assumed that there are more players at the table than just the two colluding bots.

Pursuant to the collusion detection algorithm, if Bot 2's hand rank is calculated to be greater than a predetermined value X, and Bot 2's hand rank is better than this Bot 1's hand rank, then Bot 1 plays the hand as if it has the same cards as Bot 2 and is in the same position at the table as Bot 2. Otherwise, Bot 1 plays the hand as normal, on the merits of Bot 1's hand only. This algorithm has the effect of allowing the bots to play as if they had the stronger hand, thereby raising the pot up even if they have a weaker hand. However, the algorithm accounts for the condition where the colluding bots are the only bots left in a hand by causing the bot with the weaker to fold. This collusion algorithm comprises a reasonable approximation as to what actual human colluding players would do; playing like they had the stronger hand to increase winnings until they are the only players left.

During testing of the collusion detection algorithm, several thousand games were run for three different values (0.25, 0.5, 0.75, where hand rank was parameterized from 0 to 1) of the X parameter. The three datasets correspond to three different levels of intensity of collusion (in poker terms, from very tight to very loose). The data was then loaded into a relational database for analysis against the collusion detection algorithm. The attribute variables from the relational database that were considered for analysis included: (1) player hand rank; (2) opponent hand rank; (3) player action; and (4) opponent action. Player and opponent refer to the pair of players that are being analyzed. The whole set of variables was produced at every action point during the game, such that each game yielded several variable sets. Other combinations of attribute variables were tried (such as including player position at the table and betting round), but showed no improvement from the minimum set mentioned above.

After the generation of the three datasets, two layers of analysis were run on the dataset. The first layer of analysis involved the learning of graph structures to determine what collusion looks like for these bots, and by extension, for collusion in general. The second layer of analysis examined the results of scoring the learned graph structures against all pairs of players to verify the discrimination power of the collusion detection algorithm. Specifically, standard Bayesian structure learning techniques and a genetic algorithm were used to search through different graph structures for the highest scoring graph structure given the observed data. Given the set of four variables set forth above, every player against every other player was tested, resulting in a maximum of five (out of a possible 16) distinct graph structures from every combination of players in every dataset.

Figure 4:
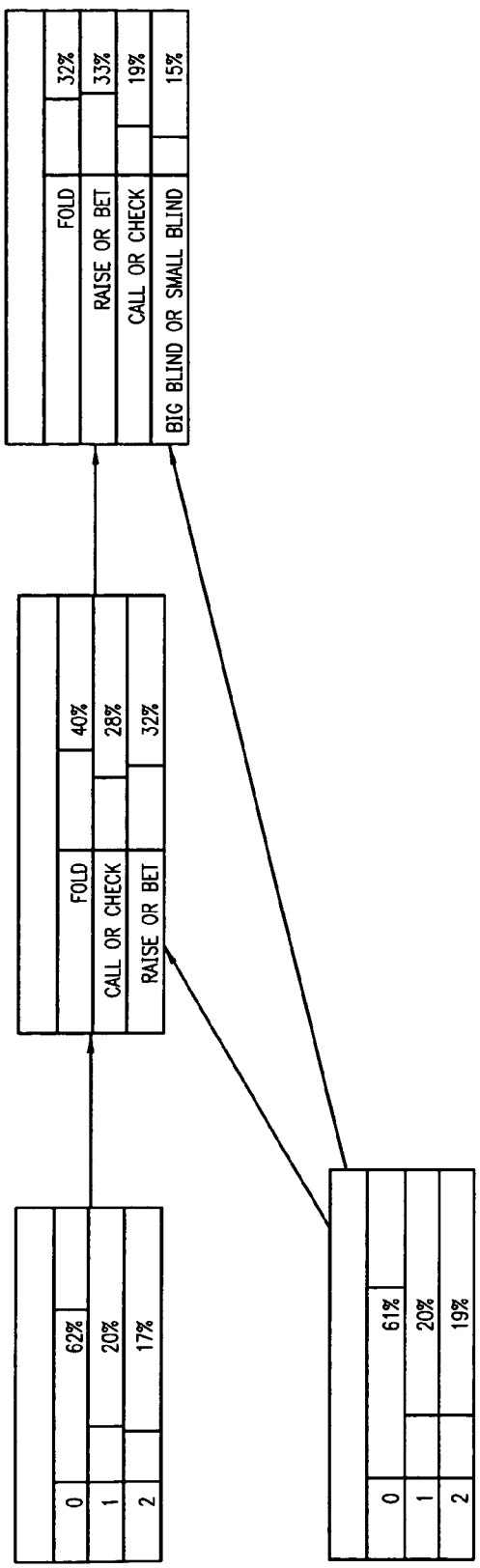
FIG. 4 is a graph that illustrates a learned Bayesian Network for colluding bots, wherein a direct causal link exists between opponent hand rank and player action.
Figure 5:
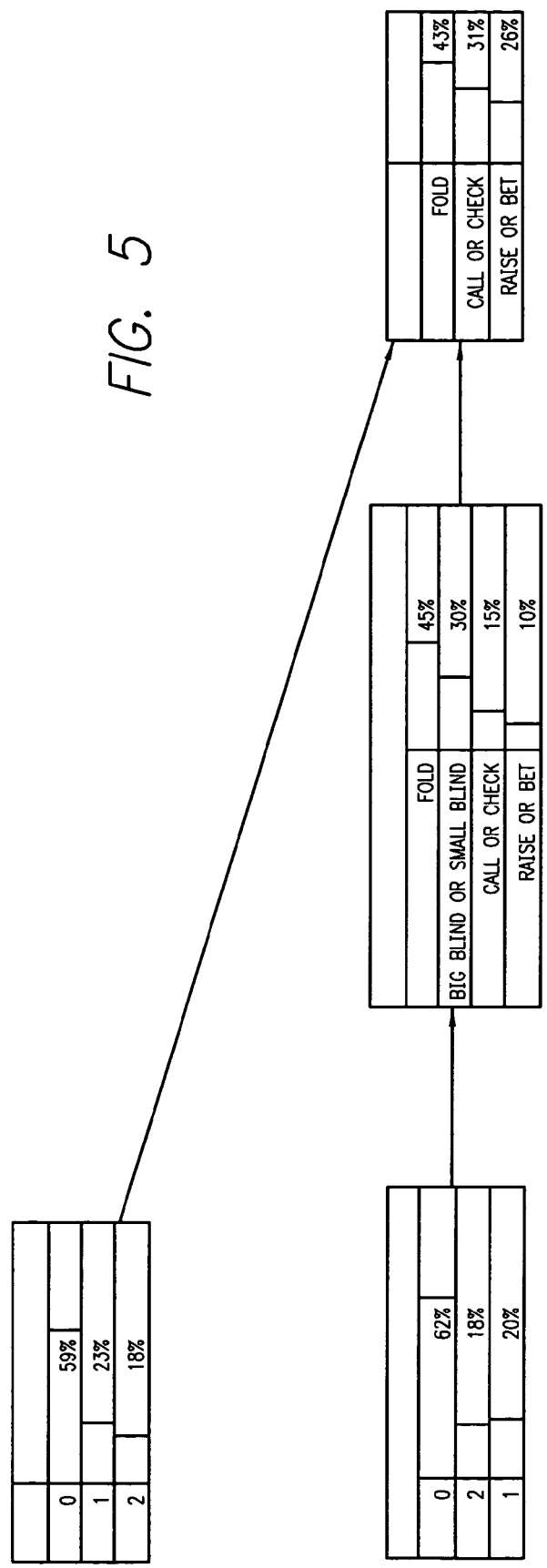
FIG. 5 illustrates a first non-collusion graph, wherein no hidden information forms a causal link.
Figure 6:
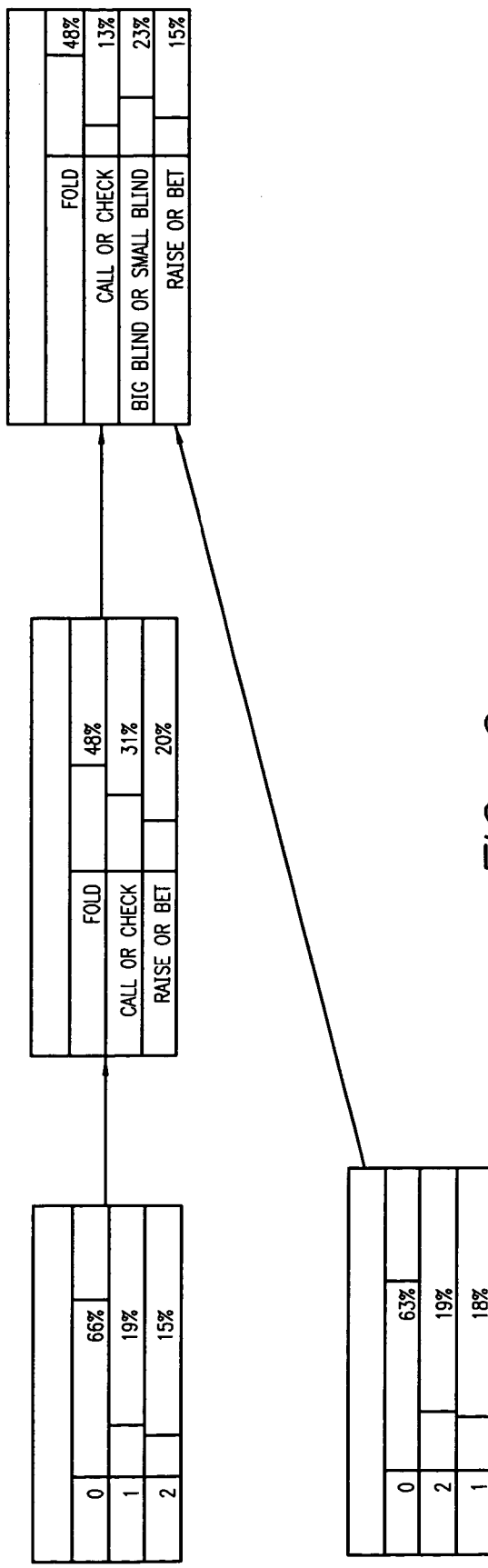
FIG. 6 illustrates a second non-collusion graph, wherein no hidden information forms a causal link.
Figure 7:
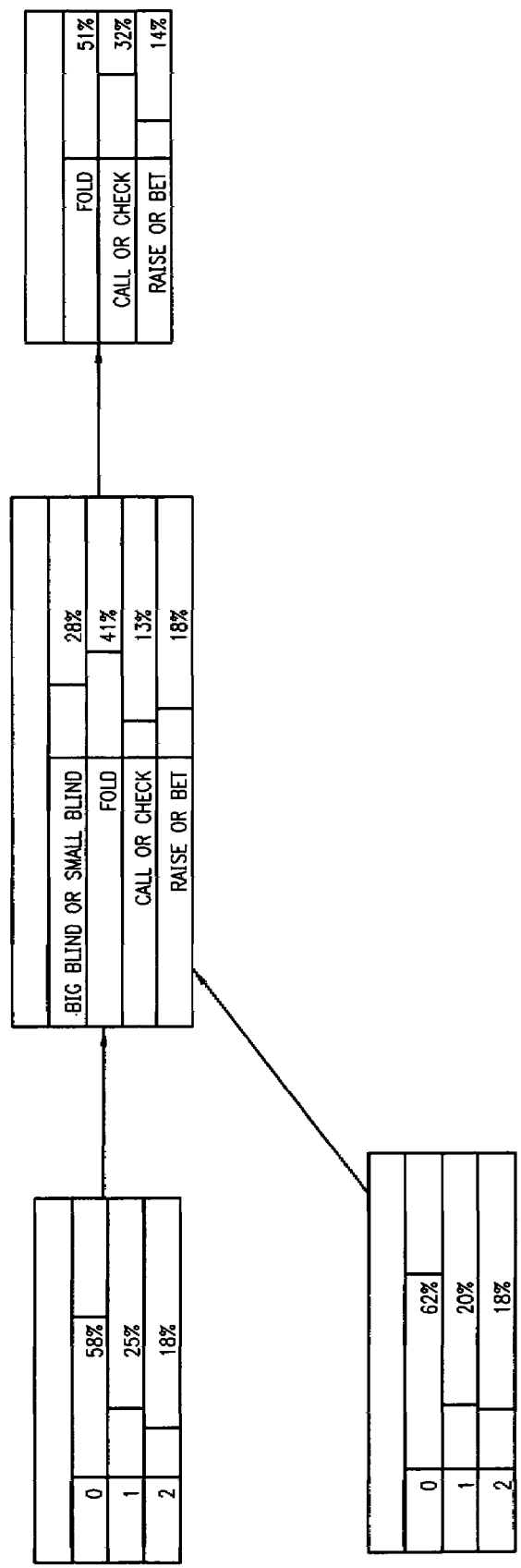
FIG. 7 illustrates a third non-collusion graph, wherein no hidden information forms a causal link.
Figure 8:
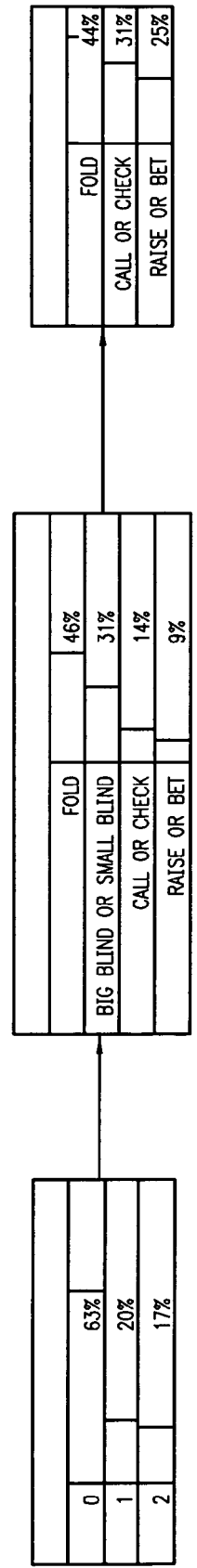
FIG. 8 illustrates a fourth non-collusion graph, wherein no hidden information forms a causal link.
Figure 8:
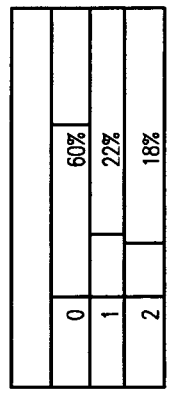

In each dataset, for the pair of colluding players, a graph was produced showing an illegal hidden relationship between the opponent's hand rank and the player's action. FIG. 4 illustrates a graph of the learned Bayesian Network for colluding bots, wherein a direct causal link exists between opponent hand rank and player action. An illegal hidden relationship was not present for most of the non-colluding player pairs. FIG. 5 illustrates a first non-collusion graph, wherein no hidden information forms a causal link. Similarly, FIG. 6 illustrates a second non-collusion graph, wherein no hidden information forms a causal link, while FIG. 7 illustrates a third non-collusion graph, wherein no hidden information forms a causal link. FIG. 8 illustrates a fourth non-collusion graph, wherein no hidden information forms a causal link. The collusion detection algorithm of the invention was able to uniquely identify collusion behavior in all three of the bot datasets (i.e., 0.25, 0.5, 0.75).

The five distinct graph structures for collusion and non-collusion illustrated in FIGS. 4-8 were examined in view of the discriminating power of the collusion detection algorithm. Specifically, this was accomplished by computing the score of all the learned graph structures (for a given dataset) of the graph structures described above while varying the number of games (and hence number of variable sets) being scored. Then, performance curves were built to depicts how well the collusion detection algorithm performs with varying amounts of data. To plot the comparisons on one chart, the logarithm of the Bayesian Score (an odds-ratio) is calculated between the collusion graph (FIG. 4, numerator of the odds ratio) and the other learned non-collusion graphs (FIGS. 5-8, denominator of odds ratio). The ratio is computed relative to the colluding graph, such that a positive ratio indicates that the colluding graph is favored. When all the curves become positive it indicates that the collusion model is favored over all others.

Figure 9:
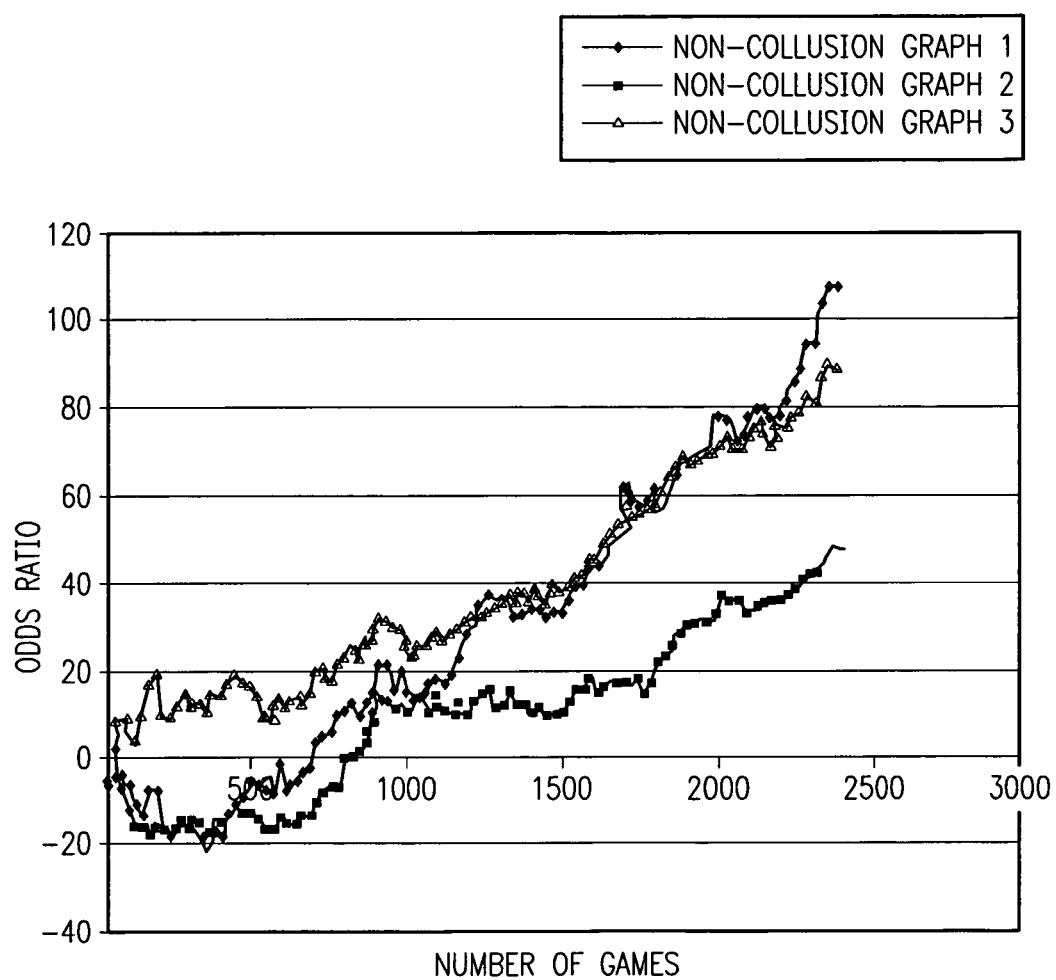
FIG. 9 illustrates a graph that represents the effect of number of games on the odds-ratio for the X=0.25 dataset.
Figure 10:
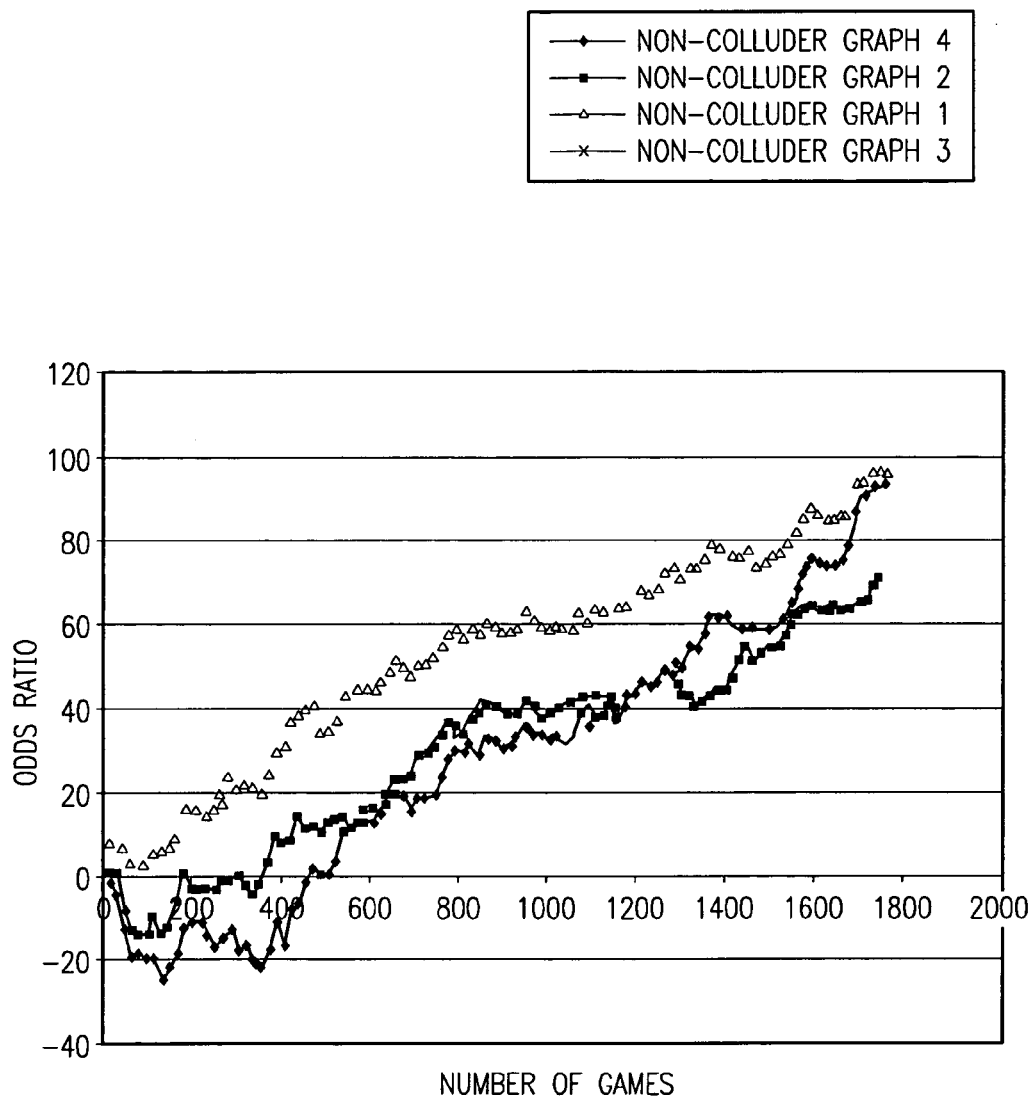
FIG. 10 illustrates a graph that represents the effect of number of games on the odds-ratio for the X=0.5 dataset.
Figure 11:
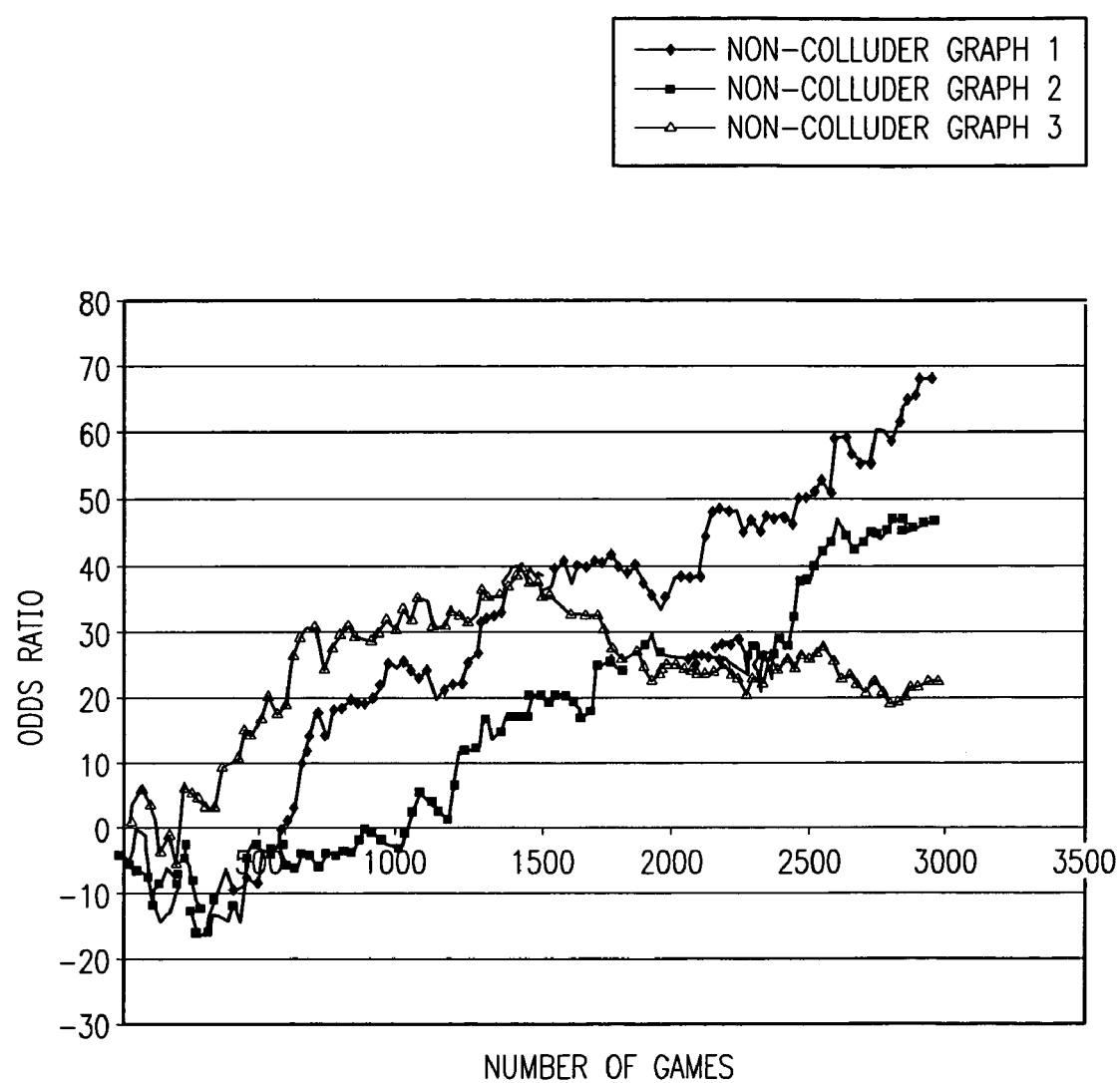
FIG. 11 illustrates a graph that represents the effect of number of games on the odds-ratio for the X=0.75 dataset.

FIGS. 9-11 illustrate the effect of the number of games on the odds-ratio for the two colluding bots. These figures depict the effect of varying the amount of data going into scoring of the graph structures for colluding players, wherein all graphs are compared to the graph of FIG. 4 to compute the odds ratio. In particular, the graph of FIG. 9 represents the effect of number of games on the odds-ratio for the X=0.25 dataset. In FIG. 9, one is able to distinguish between colluding and non-colluding models by about the 500 game mark where X=0.25. When X=0.25, the colluders play the loosest (collude the most). The graph of FIG. 10 represents the effect of number of games on the odds-ratio for the X=0.5 dataset, whereas the graph of FIG. 11 represents the effect of number of games on the odds-ratio for the X=0.75 dataset. In FIG. 10, one is able to distinguish between colluding and non-colluding models by about the 800 game mark where X=0.5. In FIG. 11, one is able to distinguish between colluding and non-colluding models by about the 1000 game mark in the worst case where X=0.75. When X=0.25, the colluders play the tightest (collude the least).

Figure 12:
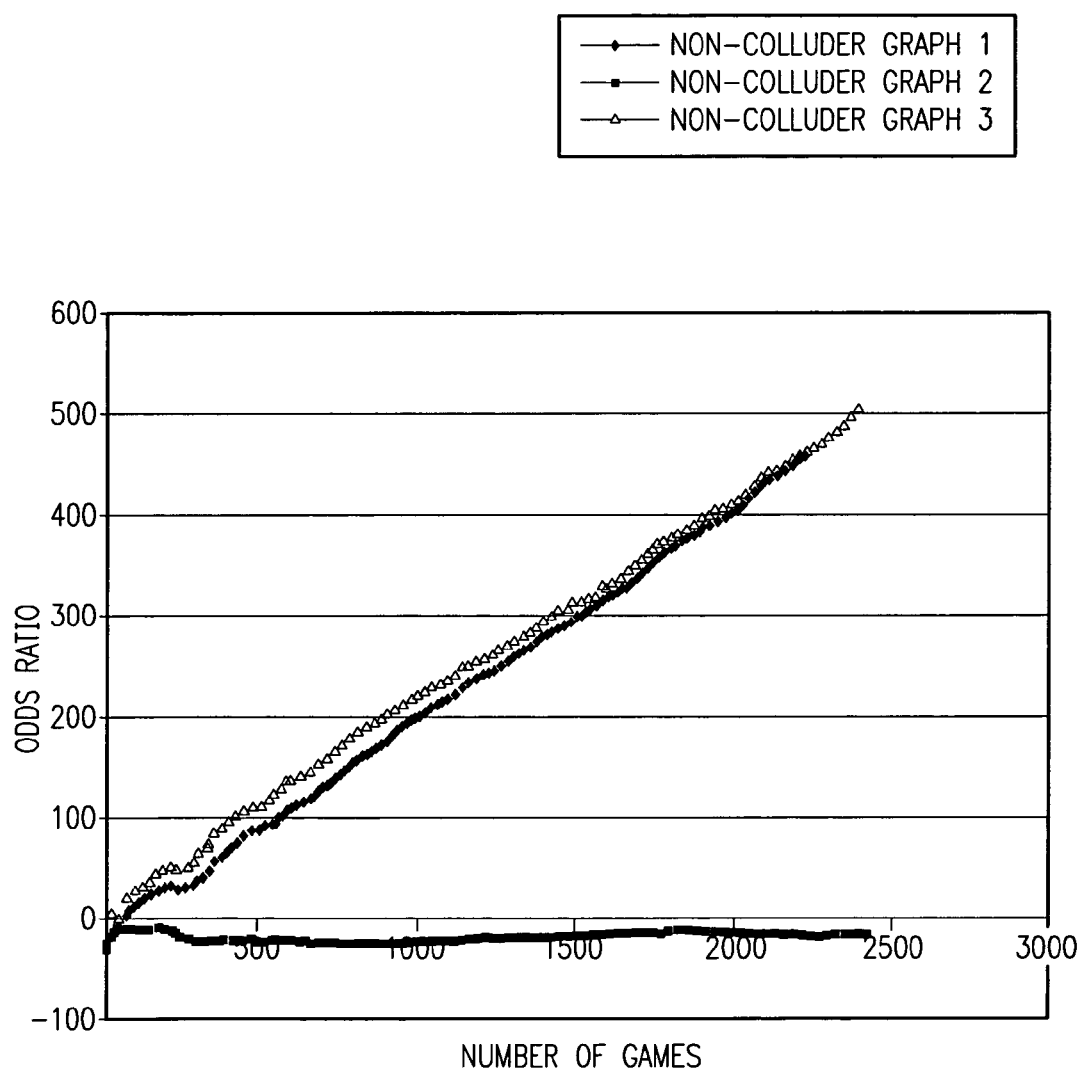
FIG. 12 illustrates a graph that represents the effect of varying the amount of data going into scoring of the graph structures for non-colluding players where X=0.25.
Figure 13:
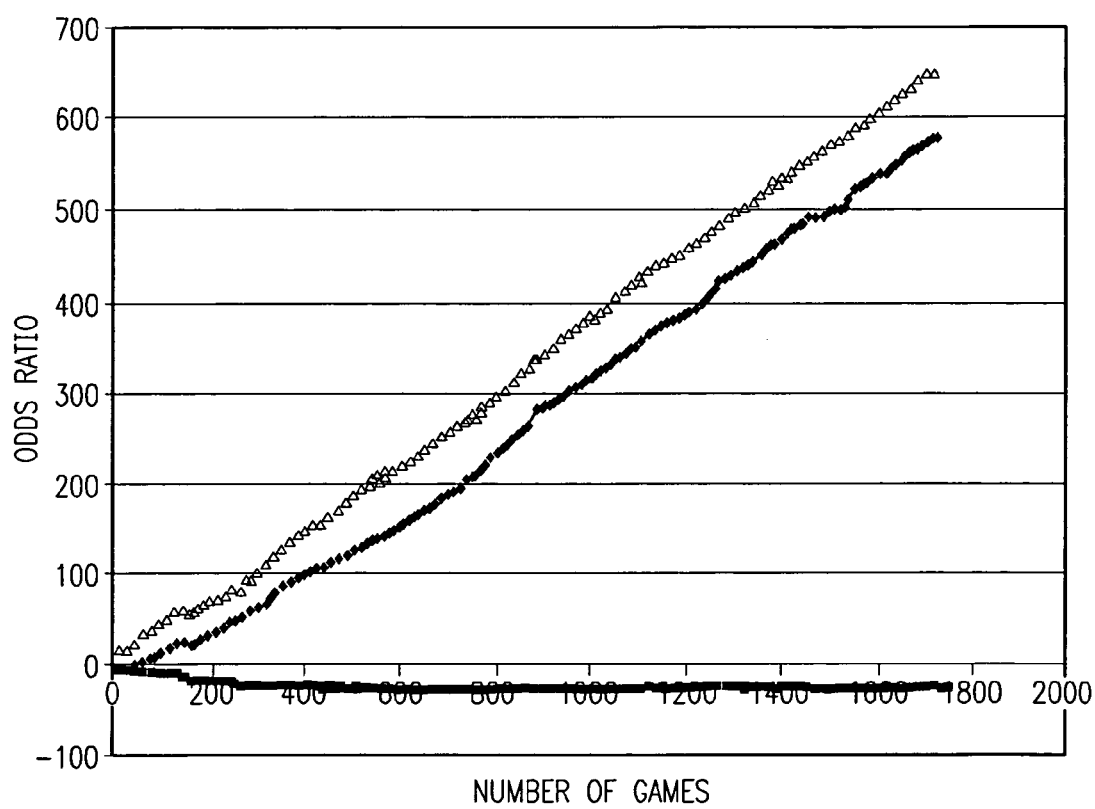
FIG. 13 illustrates a graph that represents the effect of varying the amount of data going into scoring of the graph structures for non-colluding players where X=0.5.
Figure 14:
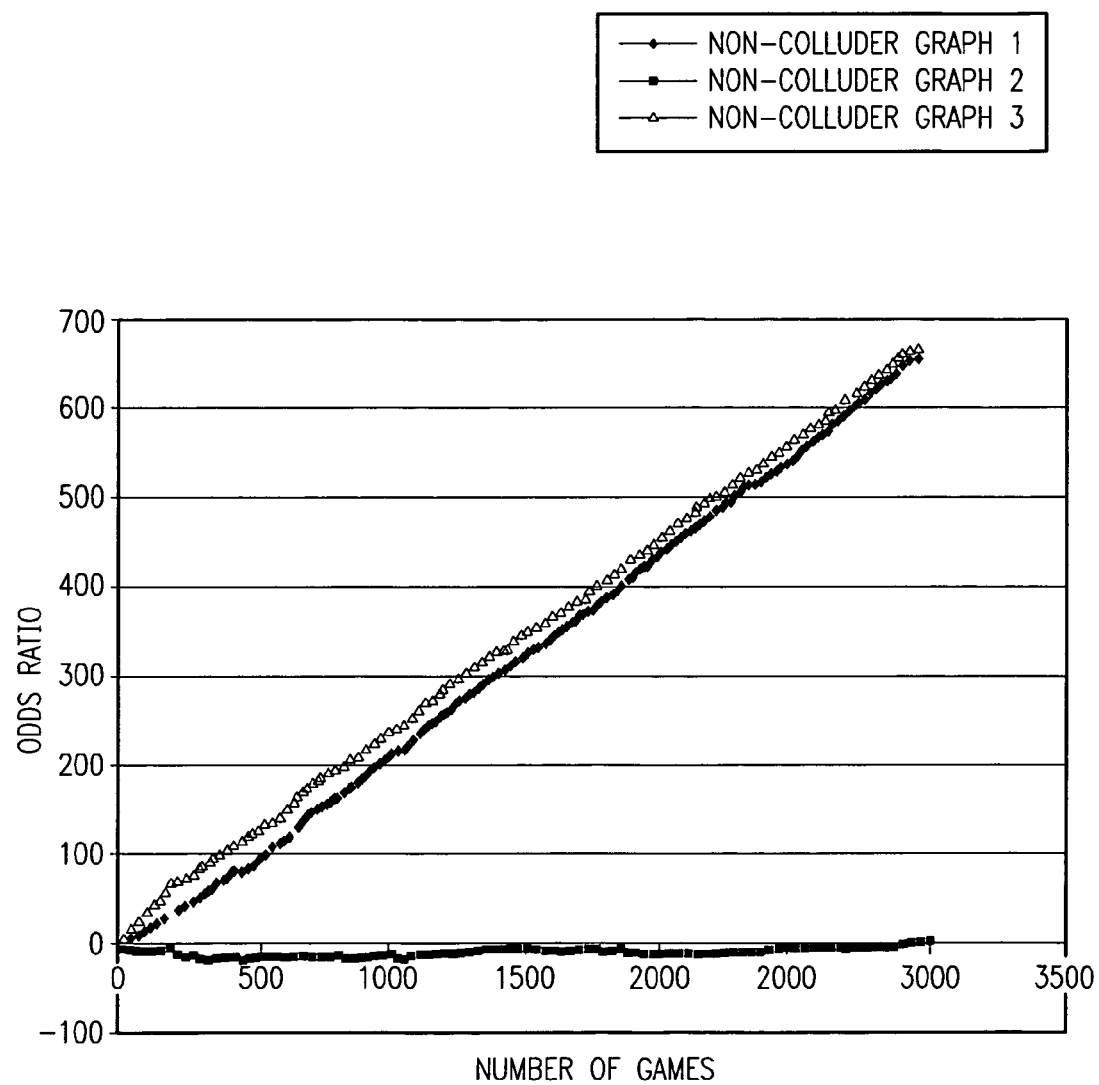
FIG. 14 illustrates a graph that represents the effect of varying the amount of data going into scoring of the graph structures for non-colluding players where X=0.75.

As a counter-example, FIGS. 12-14 depict graphs that illustrate the effect of the number of games on a randomly selected set of non-colluding players, wherein all graphs are compared to the graph of FIG. 4 to compute the odds ratio. In this case, negative odds ratios indicate that colluding is not taking place. When any curve stays negative, collusion is not the most favored model, such that a non-colluding model may be more favored than the collusion model. Particularly, FIG. 12 illustrates a graph that represents the effect of varying the amount of data going into scoring of the graph structures for non-colluding players where X=0.25. The graph of FIG. 13 illustrates a graph that represents the effect of varying the amount of data going into scoring of the graph structures for non-colluding players where X=0.5, while the graph of FIG. 14 illustrates a graph that represents the effect of varying the amount of data going into scoring of the graph structures for non-colluding players where X=0.75. In FIGS. 12-14, one can see that one of the models (such as the model of FIG. 6) does not support the colluding model. The lack of support for the colluding model at relatively small numbers of games (e.g., 200) reasonably indicates that there is no collusion between the pair of players.

The system and method for detecting collusion in online gaming for online gaming described herein is based on the hypothesis that colluders will have conditional behavior based on hidden information. The method was applied to data produced through a poker simulation utilizing bots which collude with a reasonably realistic collusion algorithm. The structure of both fair play and collusion Bayesian Networks was learned and then applied to show the discrimination power of our collusion detection algorithm. Using the system and method of the invention, one can uniquely identify colluders most of the time in on the order of 500 to 800 games for looser colluding strategies. This sort of behavioral strategy for detecting colluders offers great promise as a knowledge-light way of determining collusion that is difficult to defeat without severely limiting collusion strategies and payoff. The strategy is in contrast to a knowledge heavy rule-based system that can be exploited.

Thus, it is seen that a method for detecting collusion in online gaming via conditional behavior is provided. One skilled in the art will appreciate that the present invention can be practiced by other than the various embodiments and preferred embodiments, which are presented in this description for purposes of illustration and not of limitation, and the present invention is limited only by the claims that follow. It is noted that equivalents for the particular embodiments discussed in this description may practice the invention as well.

The invention claimed is:

1. A method for detecting collusion in online poker involving a plurality of players, comprising the steps of:
   collecting data on every action in every game for every player and sending the data to an online poker database;
   storing hidden game information data on every action in every game for every player in the online poker database;
   storing game action data on every action in every game for every player in the online poker database;

performing a player action analysis of correlated actions between a pair of online poker players and building a user action database with data obtained in the player action analysis;

creating two or more Bayesian Network graphical models including at least one collusional model to represent forms of collusional behavior and at least one non-collusional model to represent forms of non-collusional behavior;

employing the created Bayesian Network graphical models to determine a likelihood of conditional behavior between the pair of online poker players;

after determining the likelihood of conditional behavior, computing individual scores for the Bayesian Network graphical models using a Bayesian statistical technique;

comparing the computed score of a collusional model with that of a non-collusional model;

after comparing the computed scores, performing a collusion threshold analysis using a thresholding scheme to determine whether the collusional model indicates collusion for the pair of online poker players; and notifying an appropriate party of unfair collusional play if it is determined that the collusional model is appropriate for the pair of online poker players.

2. The method of claim 1, further comprising the step of sending an analysis results alert to notify an appropriate online poker firm of the possibility of unfair collusional play.

3. The method of claim 1, wherein the step of collecting data involves the collection of historical information that is used to construct and analyze models of behavior for the detection of collusion.

4. The method of claim 1, wherein the step of collecting data involves the collection of streamed information that is used to construct and analyze models of behavior for the detection of collusion.

5. The method of claim 1, further comprising the step of determining a likelihood of fairness of a particular poker game.

6. The method of claim 1, further comprising the step of probabilistically evaluating the play of a particular online poker player.

7. A system for detecting collusion in online poker among a plurality of online poker players, comprising:

an online poker firm;

a collusion detection suite designed to discover collaboration among pairs of players in an online poker game;

an online poker server that controls the functionality of online games;

an online poker database that receives hidden game information and game action data from the online poker server;

a first Bayesian Network graphical models designed to represent forms of collusional behavior; and a second Bayesian Network graphical models designed to represent forms of non-collusional behavior;

wherein the online poker firm collects and stores data on every action in every game for every player in the online poker database;

wherein the collusion detection suite examines the data in the online poker database to determine the likelihood that two or more online poker players are collaborating with one another;

wherein the collusion detection suite is employed to create one or more Bayesian Network graphical models to determine the likelihood of conditional behavior between a pair of online poker players;

wherein the collusion detection suite compares the scores of the collusional and non-collusional models; and wherein the collusion detection suite uses a thresholding scheme to determine whether the collusional model is appropriate for the pair of online poker players wherein an appropriate party is notified of unfair collusional play if it is determined that the collusional model is appropriate for the pair of online poker players.

8. The system of claim 7, wherein the collusion detection suite examines data on every combination of pairs of players that are playing in the same poker game.

9. The system of claim 7, wherein the collusion detection suite includes a user action database for storing information pertaining to correlated actions between two online poker players.

10. The system of claim 7, wherein the system alerts the online poker firm of the possibility of unfair collusional play if the collusion detection suite determines that the collusional model is appropriate for the pair of online poker game players.

* * * * *